(12) United States Patent
Wang et al.

(10) Patent No.: US 8,708,543 B2
(45) Date of Patent: Apr. 29, 2014

(54) LIGHT ENGINE HAVING DISTRIBUTED REMOTE PHOSPHORS

(75) Inventors: Dongxue Wang, Lexington, MA (US);
Matthew A Stough, Exeter, NH (US);
Martin Zachau, Geltendorf (DE)

(73) Assignee: Osram Sylvania Inc., Danvers, MA (US)

( * ) Notice: Subject to any disclaimer, the term of this patent is extended or adjusted under 35 U.S.C. 154(b) by 286 days.

(21) Appl. No.: 13/206,717

(22) Filed: Aug. 10, 2011

(65) Prior Publication Data
US 2013/0039029 A1    Feb. 14, 2013

(51) Int. Cl.
*F21V 7/04* (2006.01)

(52) U.S. Cl.
USPC ............................ 362/617; 362/558; 362/618

(58) Field of Classification Search
USPC .................. 362/617, 619, 620, 551, 553, 558
See application file for complete search history.

(56) References Cited

U.S. PATENT DOCUMENTS

| | | | |
|---|---|---|---|
| 4,946,253 A | 8/1990 | Kostuck | |
| 5,396,406 A * | 3/1995 | Ketchpel | 362/27 |
| 5,515,184 A | 5/1996 | Caulfield | |
| 5,854,697 A | 12/1998 | Caulfield | |
| 6,760,515 B1 | 7/2004 | Wang | |
| 7,375,382 B2 | 5/2008 | Tessnow | |
| 7,478,913 B2 * | 1/2009 | Epstein et al. | 362/30 |
| 7,598,534 B2 | 10/2009 | Swantner | |
| 7,686,496 B2 * | 3/2010 | Hiraishi et al. | 362/620 |
| 7,742,123 B2 * | 6/2010 | Jung | 349/62 |
| 7,800,287 B2 | 9/2010 | Zheng | |
| 8,033,706 B1 * | 10/2011 | Kelly et al. | 362/607 |
| 8,168,271 B2 * | 5/2012 | Jones et al. | 428/1.31 |
| 8,393,774 B2 * | 3/2013 | Krijn et al. | 362/612 |
| 2006/0152943 A1 * | 7/2006 | Ko et al. | 362/627 |
| 2008/0030974 A1 * | 2/2008 | Abu-Ageel | 362/19 |
| 2009/0179548 A1 | 7/2009 | Lai | |
| 2010/0302218 A1 * | 12/2010 | Bita et al. | 345/204 |
| 2010/0302802 A1 * | 12/2010 | Bita et al. | 362/606 |

FOREIGN PATENT DOCUMENTS

| | | |
|---|---|---|
| EP | 1256835 A2 | 11/2002 |
| WO | 2010052633 A1 | 5/2010 |
| WO | 2011089097 A1 | 7/2011 |

OTHER PUBLICATIONS

PCT/US2012/05090, Int. Search Report Dated Oct. 30, 2012.
Hirabayashi et al, Multilayer holographic recording using a two-color-absorption photopolymer, Applied Optics, vol. 46, No. 35, pp. 8402, 2007.
Lee et al, Silicon-based transmissive diffractive optical element, Optics Letters, vol. 28, No. 14, pp. 1260, 2003.
Amitai et al, Design of substrate-mode holographic interconnects with different recording and readout wavelengths, Applied Optics, vol. 30, No. 17, pp. 2376, 1991.

* cited by examiner

*Primary Examiner* — John A Ward
(74) *Attorney, Agent, or Firm* — Andrew Martin

(57) ABSTRACT

There is herein described a light engine that emits a light. The light engine includes a light source, a light guide, a plurality of extraction optical elements, and a plurality of phosphors. The light guide receives the light. The extraction optical elements are on the surface of the light guide. The extraction optical elements extract at least a portion of the light out of the light guide. The phosphors are disposed on top of at least some of the extraction optical elements.

27 Claims, 3 Drawing Sheets

LIGHT ENGINE HAVING DISTRIBUTED REMOTE PHOSPHORS

TECHNICAL FIELD

This invention relates to light engines. In particular, this invention relates to light engines containing light guides and phosphors.

BACKGROUND

Light sources are desired to be as small as possible. The advent of solid-state lighting has been drastically reducing the size of the light source. On the other side, large field area may need to be illuminated and a lighting pattern needs to be displayed. It is still a need to spread beam-forming illumination over a broad area to display a large area lighting pattern. One solution is using many light sources such as multiple LED chips. The solution is costly due to the large number of LED chips. Another solution is using a light guide having multiple surface features such as grooves. The light from the light source travels through the light guide and is extracted outward at multiple surface features to form the lighting pattern at a large area. Typically this solution has an efficiency loss of more than 20%. The lighting pattern is usually uneven because the extraction efficiency of every surface features is hard to control. It is difficult to control the spatial distribution of the surface features and the illumination pattern.

SUMMARY OF THE INVENTION

It is an object of the invention to obviate the disadvantages of the prior art.

It is a further object of the invention to provide a highly efficient light engine having one or more light sources and a large area lighting pattern with desired color characteristics. The extraction efficiency is controllable; therefore, the luminance distribution of the lighting pattern can be accurately fine-tuned. The present invention may be utilized in various technology fields such as general lighting, television, computer monitor, and mobile display.

According to an embodiment, there is provided light engine that emits a light. The light engine includes a light source, a light guide, a plurality of extraction optical elements, and a plurality of phosphors. The light guide receives the light. The extraction optical elements are on the surface of the light guide. The extraction optical elements extract at least a portion of the light out of the light guide. The phosphors are disposed on top of at least some of the extraction optical elements.

In a related embodiment, the light source may be one or more laser diodes, LEDs, collimated LEDs, or resonant cavity LEDs. The light source can be coupled into from different facets of waveguides through refractive optical elements such as prisms or diffractive optical elements, such as single substrate hologram or multiplexed holograms.

In another related embodiment, the input optical element and extraction optical elements may be diffractive optical elements or refractive optical elements. In yet another related embodiment, the diffractive optical elements may be volume grating, or surface grating. In still another related embodiment, the refractive optical elements may be prisms or cubes.

In another embodiment, a spatial light modulator is provided to provide different tunable color at different spatial locations with tunable intensities and color temperatures in case of white light. In another embodiment, a general purpose solid state lighting luminaire is provided with omni-directional lighting distribution by coupling light out of four surfaces of the waveguide, i.e., top, bottom, front and back surfaces.

DETAILED DESCRIPTION

For a better understanding of the present invention, together with other and further objects, advantages and capabilities thereof, reference is made to the following disclosure and appended claims taken in conjunction with the above-described drawings.

Figure 1:
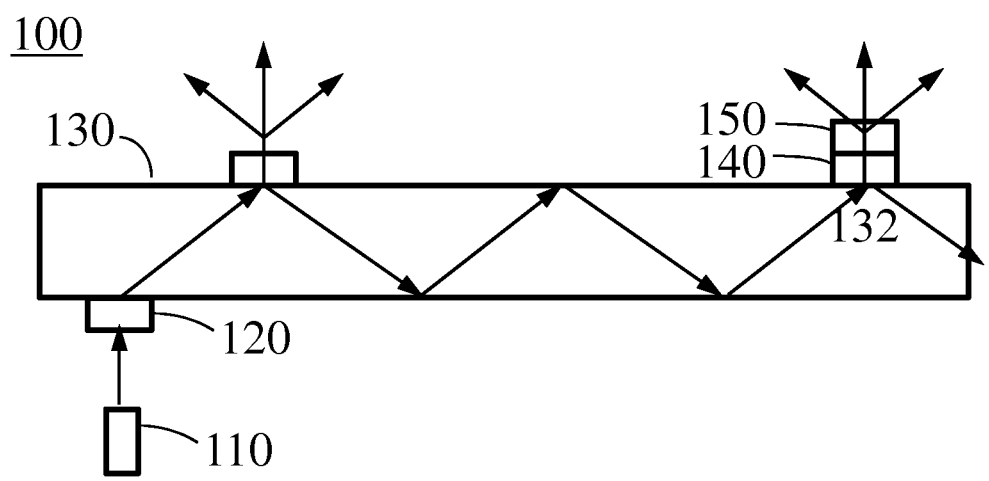
FIG. 1 is a schematic illustration of a light engine according to an embodiment of the present invention.

With reference to FIG. 1, a light engine 100, in accordance with a first embodiment of the present invention is shown. The light engine 100 includes a light source 110, preferable a laser diode, more preferable a blue laser diode. The light source 110 may have a collimated beam. The light source 110 emits a light into a light guide 130. The light source 110 may emit a monochromatic light or a white light with a tunable color temperature. There may be an input optical element 120 on the surface of light guide 130 so that the light emitted from light source 110 is guided through optical element 120 and then enters light guide 130. The optical element 120 may be a diffractive optical element (DOE), preferably a volume phase grating. By adjusting the input direction of light source 110 and parameters of the input optical element 120, such as a grating fringes which are determined by the grating vector of a volume phase grating, the light enters light guide 130 at the normal incident angle and is diffracted at 45 degrees to the normal of bottom surface of the waveguide. The light propagates inside the light guide 130 at guided modes via total internal reflections, and coupled outside the light guide 130 where the diffractive grating is located, at the normal angle to the surface of the light guide. As shown in FIG. 1, the light is extracted at a plurality of extraction sites 132 on light guide 130 each by an extraction optical element 140. The extraction optical elements 140 may be diffractive optical elements (DOEs), preferably volume phase gratings. The diffraction efficiency of diffraction optical elements can be determined by the refractive index modulation, the grating thickness, and other fabrication parameters of the diffraction optical elements. In general, the diffraction efficiency may be configured at about from 5% to 90%. For example, if the diffraction efficiency of each diffraction optical element is configured to about 10%, the total number of extraction sites 132 may be more than 8. On each extraction site 132, a phosphor 150, preferably a yellow-emitting phosphor, is disposed on top of extraction optical element 140, where a small air gap may be left between extraction optical element 140 and phosphor 150 to aid the portion of light that is not diffracted back to the light guide. The extracted light is converted by the phosphor 150. The converted yellow light combines with the blue light from light source to render the desirable white light. The light extracted by extraction optical elements 140 may be a highly directional light with a narrow beam angle, and can be further spread through the scattering from phosphors. For the purposes such as general lighting, signage, and display lighting, it is desirable to have an output light with a wide beam angle. Therefore, the phosphors not only convert the wavelength of the light, but also diffuse the light rays and widen the output beam angle. Since the extraction efficiency of the diffractive optical elements is controllable, the luminance distribution of the lighting pattern may be accurately fine-tuned, and preferably even.

Figure 2:
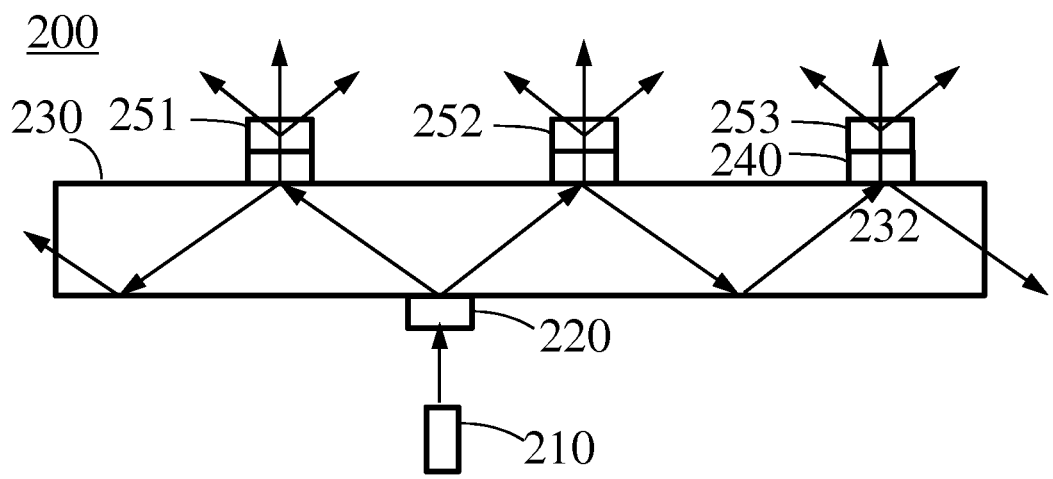
FIG. 2 is a schematic illustration of a light engine according to another embodiment of the present invention.

A second embodiment according to the present invention is shown in FIG. 2. The light engine 200 includes a light source 210, preferable a laser diode, more preferable an ultraviolet laser diode. The light source 210 may be a laser diode or a collimated LED that have a narrow beam angle. The light source 210 emits a light into a light guide 230. There may be an input optical element 220 on the surface of light guide 230 so that the light emitted from light source 210 is guided through optical element 220 and then enters light guide 230. The optical element 220 may be a diffractive optical element (DOE), preferably a multiplexed volume phase grating to diffract light into two different directions. By adjusting the input direction of light source 210 and the input optical element 220, such as the grating fringes orientation of a volume phase grating, the light enters light guide 230 in such a direction that the light propagates along light guide 230 via total internal reflections. As shown in FIG. 2, the light is extracted at a plurality of extraction sites 232 on light guide 230 each by an extraction optical element 240. The extraction optical elements 240 may be diffractive optical elements (DOEs), preferably volume phase gratings. On at least one of extraction sites 232, a red-emitting phosphor 251 is disposed on top of extraction optical element 240. On another of extraction site 232, a green-emitting phosphor 252 is disposed on top of extraction optical element 240. On yet another of extraction site 232, a blue-emitting phosphor 253 is disposed on top of extraction optical element 240. The extracted light is converted by the red emitting, green-emitting, and blue-emitting phosphors 251, 252, and 253. The converted light renders a light pattern comprising different colors.

Figure 3:
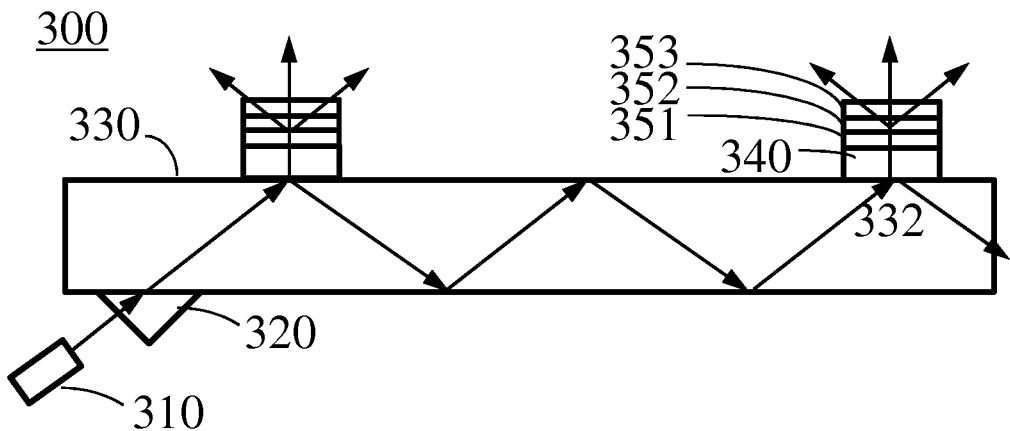
FIG. 3 is a schematic illustration of a light engine according to yet another embodiment of the present invention.

A third embodiment according to the present invention is shown in FIG. 3. The light engine 300 includes a light source 310, preferable a collimated LED, more preferable an ultraviolet resonant cavity LED. The light source 310 is a collimated. The light source 310 emits a light into a light guide 330. There may be an input optical element 320 on the surface of light guide 330 so that the light emitted from light source 310 is guided through optical element 320 and then enters light guide 330. The optical element 320 may be a refractive optical element (ROE), preferably a prism. The prism may be attached to or etched from light guide 330. By adjusting the input direction of light source 310 and the input optical element 320, such as the surface direction of the prism, the light enters light guide 330 in such a direction that the light propagates along light guide 330 via total internal reflections. As shown in FIG. 3, the light is extracted at a plurality of extraction sites 332 on light guide 330 each by an extraction optical element 340. Optical elements 340 may be refractive optical elements (ROEs), preferably optical cubes. The light is incident at an angle less than but close to the critical angle so that light is partially reflected back to the light guide, and partially refracted into the ROE. The ratio of reflected and refracted light is governed by Snells' law. On at least one of extraction site 332, a yellow-emitting phosphor 350 is disposed on top of extraction optical element 340. On at least one of extraction site 332, a red-emitting phosphor 351, a green-emitting phosphor 352, and a blue-emitting phosphor 353 are disposed on top of extraction optical element 340. The extraction efficiency depends on the light incident angle and the refractive indices of phosphors and light guide. A diffuser 360 may be disposed above the phosphors to mix the light from extraction sites 332 to render a soft white light for general lighting purpose.

Figure 4:
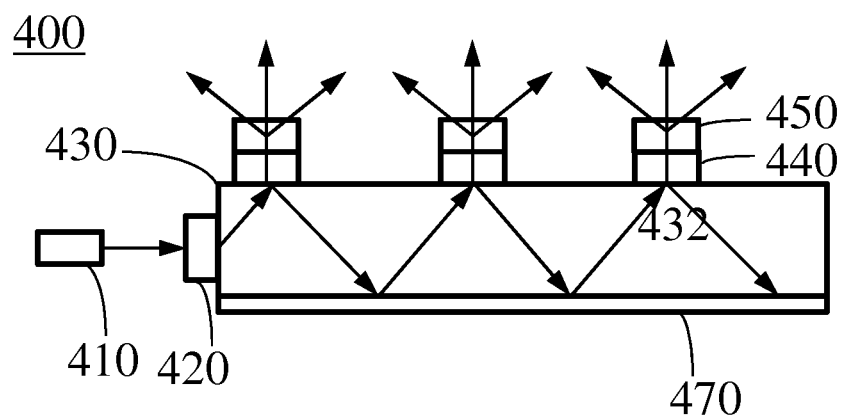
FIG. 4 is a schematic illustration of a light engine according to still yet another embodiment of the present invention.

A fourth embodiment according to the present invention is shown in FIG. 4. A light engine 400 includes a light source 410, preferable a laser diode, more preferable a blue laser diode. The light source 410 may have a narrow beam angle of less than 5 degrees after collimation or beam shaping. The light source 410 emits a light into a light guide 430. There may be an input optical element 420 on the surface of light guide 430 so that the light emitted from light source 410 is guided through optical element 420 and then enters light guide 430. The optical element 420 may be a diffractive optical element (DOE), preferably a volume phase grating. As shown in FIG. 4, the light is extracted at a plurality of extraction sites 432 on light guide 430 each by an extraction optical element 440. The extraction optical elements 440 may be diffractive optical elements (DOEs), preferably volume phase gratings. The diffraction efficiency of diffraction optical elements can be determined by the refractive index modulation, the grating thickness, and other fabrication parameters of the diffraction optical elements. In general, the diffraction efficiency may be configured at about from 5% to 90%. For example, if the diffraction efficiency of each diffraction optical element is configured to about 10%. The total number of extraction sites 432 may be more than 8. On each extraction site 432, a phosphor 450, preferably a yellow-emitting phosphor, is disposed on top of extraction optical element 440. The extracted light is converted by the phosphor 450. At least a portion of the surface of the light guide 430 is coated with reflection layer 470 so that it can reflect the light with incident angle less than the critical angle. The reflection layer 470 may be a multi-layer optical thin film filter such as a Distributed Bragg Reflection (DBR) filter. The converted yellow light combines with the blue light from light source to render the desirable white light. The light extracted by extraction optical elements 440 is typically a highly directional light with a narrow beam angle. For the purposes such as general lighting, signage, and display lighting, it is desirable to have an output light with a wide beam angle. Therefore, the phosphors not only convert the wavelength of the light, but also diffuse the light rays and widen the output beam angle.

Figure 5:
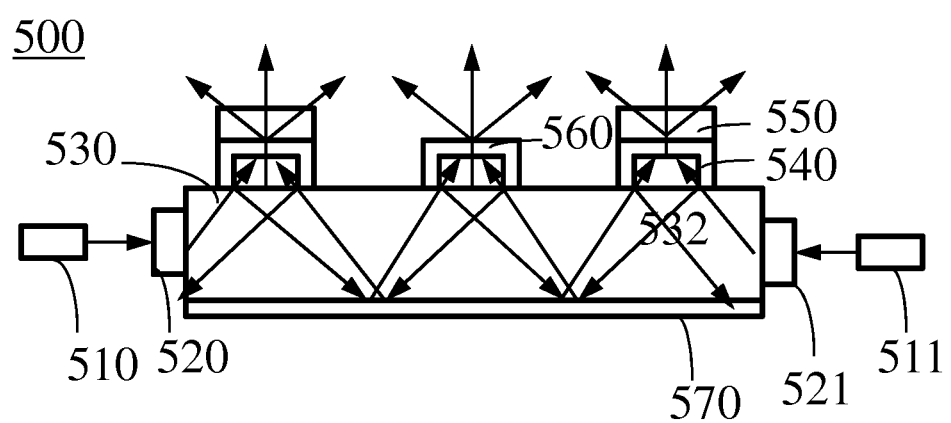
FIG. 5 is a schematic illustration of a light engine according to yet still another embodiment of the present invention.

A fifth embodiment according to the present invention is shown in FIG. 5. A light engine 500 includes a first light source 510, preferable a laser diode or a collimated LED. The light source 510 may have a narrow beam angle of less than 5 degrees after collimation. The light source 510 emits a light entering a left surface of a light guide 530. There may be an input optical element 520 on the surface of light guide 530 so that the light emitted from light source 510 is guided through optical element 520 and then enters light guide 530. The optical element 520 may be a diffractive optical element (DOE), preferably a volume phase grating. There is a second light source 511 and DOE 521 on the right side of the light guide 530, in an arrangement similar to the light source 510 and DOE 520. As shown in FIG. 5, the light is extracted at a plurality of extraction sites 532 on light guide 530 each by an extraction optical element 540. Some of the extraction optical elements 540 may be hollow ROE cubes 540, and the amount of reflected and refracted light is determined by Snell's law. Some of the extraction optical elements 540 may be hollow phosphor cubes 560. The surfaces of the ROE cubes 540 and phosphor cubes 560 may be textured to scatter the pumped light. On at least one of extraction site 532, a phosphor 550, such as a yellow-emitting phosphor, is disposed on top of extraction optical element 540. The extracted light is converted by the phosphor 550. At least a portion of the surface of the light guide 530 is coated with reflection layer 570. The reflection layer 570 may be an optical thin film filter such as a Distributed Bragg Reflection (DBR) filter. The converted yellow light combines with the blue light from light source to render the desirable white light.

In another embodiment according to the present invention, there are multiple light sources, such as collimated LEDs, resonant cavity LEDs, or laser diodes. Each light source is optically coupled with an input optical element on the surface of the light guide so that the light enters the light guides the light guide and propagates along the light guide via total internal reflections. The input optical elements may be diffractive optical elements, refractive optical elements, or a combination thereof. Extraction optical elements are disposed on the surface of the light guide to extract the light at multiple extraction sites. The extraction optical elements may be diffractive optical elements, refractive optical elements, or a combination thereof. Phosphors are disposed on top of the extraction optical elements to convert and diffuse the light into a light with desired colors and softness.

In yet another embodiment according to the present invention, there are a two dimensional array of pixels. Each pixel includes a laser diode or LED, and a light guide coated with red, green, blue phosphors and switchable DOE at three different locations of the light guide. Each pixel may be addressed by a digital controller and the switchable DOE is programmed to display color and intensity information. The device is suitable for, but not limited to, a TV or display.

In still yet another embodiment according to the present invention, the light source may be a laser and the light is extracted from the light guide by DOE. It is possible to engineer the phosphor and its host crystal and to properly follow the selection rules of optical polarization so that either polarized monochromatic RGB (red/green/blue) light or polarized white light may be obtained. Thus, polarized TV and display may be realized for an easy-to-implement 3-D display.

In some embodiments, the diffractive optical elements may be fabricated using hologram with photopolymers, substrate mode hologram, binary optics, or computer generated hologram (CGH). In some embodiments, the phosphors may be made in different geometries, such as a planar thin film, a cube, or a spherical dome. In some embodiments, the diffractive optical elements may be electrically switched on and off to adjust the lighting pattern. In some embodiments, the diffractive optical elements may be electrically tunable, which means the diffraction pattern of the elements may be tuned electrically. In some embodiments, the shape of the light guide may be circular, rectangular, or slab-shaped. In some embodiments, the light guide may be a flexible light guide. The phosphors may be disposed by the methods of, but not limited to, spray, ink-jet, screen-printing, or a combination thereof.

A diffraction optical element, such as substrate mode hologram, may be constructed by the following method. A recoding medium of photosensitive materials, such as dichromated gelatin (DCG) emulsion or photopolymer, is laminated on a glass or plastic substrate. Two optical beams including a reference beam and an object beam are incident on the record medium. The interference fringe pattern is recorded on the recording medium to form a diffraction grating. The orientation of the diffraction grating is determined by the construction configuration, the incident angles of the reference beam and the object beam. In general, the substrate mode hologram is a transmission type, thick volume phase grating which offers high diffractive emission. The diffraction efficiency of the substrate mode hologram may be determined by the couple mode theory by which the efficiency is a function of the grating thickness, the index modulation and grating reconstruction configuration. For most cases, the grating is operated at the Bragg condition, and the equation of diffraction efficiency can be simplified as:

$$DE = \sin^2\left(\frac{\pi}{\lambda \cos\theta_o} T n_1\right) \quad (1)$$

where $\lambda$ is the optical wavelength, $\theta_o$ is the incident beam angle; the index modulation $n_1$ is the location variant of overall refractive index n in the following equations:

$$n = n_o + n_1 \cos(K \cdot r) \quad (2)$$

where K denotes the grating vector and r is the spatial position vector. Thus, the diffraction efficiency may be adjusted by controlling the index modulation $n_1$ and the grating thickness T, which is on the order of 10 μm.

The diffraction grating may be fabricated by the two beam interference method as outlined in the previous paragraph, where the interference fringes determined by the second term on the right side of Equation (2) are analogically recorded on a photosensitive material. The diffraction grating may also be implemented using digital topics such as binary optics or computer generated hologram (CGH) to record the grating fringes digitally using lithographic techniques and digital encoding techniques.

While the principles of the invention have been described herein, it is to be understood by those skilled in the art that this description is made only by way of example and not as a limitation as to the scope of the invention. Reference numerals corresponding to the embodiments described herein may be provided in the following claims as a means of convenient reference to the examples of the claimed subject matter shown in the drawings. It is to be understood however, that the reference numerals are not intended to limit the scope of the claims. Other embodiments are contemplated within the scope of the present invention in addition to the exemplary embodiments shown and described herein. Modifications and substitutions by one of ordinary skill in the art are considered to be within the scope of the present invention, which is not to be limited except by the recitations of the following claims.

What is claimed is:

1. A light engine emitting a light, the light engine comprising:
   a light source;
   a light guide receiving the light;
   a plurality of extraction optical elements on a surface of the light guide, the extraction optical elements extracting at least a portion of the light out of the light guide wherein the extraction optical elements are diffractive optical elements and are capable of individually being electrically switched on and off; and
   a plurality of phosphors, the phosphors being disposed on top of at least some of the extraction optical elements wherein an air gap is provide between the phosphors and the extraction optical element.

2. The light engine of claim 1, further comprising an input optical element on the surface of the light source, the input optical element guiding the light from the light source into the light guide.

3. The light engine of claim 2, wherein the input optical element is arranged so that the light propagates inside the light guide via total internal reflections.

4. The light engine of claim 2, wherein the input optical element is a diffractive optical element or a refractive optical element.

5. The light engine of claim 4, wherein the diffractive optical element is a volume grating or surface grating.

6. The light engine of claim 4, wherein the refractive optical element is a prism or cube.

7. The light engine of claim 2, wherein the input optical element are electrically tunable.

8. The light engine of claim 1, wherein the light source comprises a source selected from the group consisting of a laser diode, a LED, a collimated LED, and a resonant cavity LED.

9. The light engine of claim 8, wherein the diffractive optical elements are fabricated using hologram with photo-polymers, binary optics, or computer generated hologram (CGH).

10. The light engine of claim 1, wherein the light source comprises a source selected from the group consisting of a blue laser diode, an ultraviolet diode, a blue collimated LED, and an ultraviolet collimated LED.

11. The light engine of claim 1, wherein the diffractive optical elements are volume gratings or surface gratings.

12. The light engine of claim 1, wherein the refractive optical elements are prisms or cubes.

13. The light engine of claim 1, wherein at least some of the phosphors are yellow-emitting phosphors.

14. The light engine of claim 1, wherein at least some of the phosphors are red-emitting phosphors, green-emitting phosphors or blue-emitting phosphors.

15. The light engine of claim 1, further comprising a diffuser disposed above the phosphors.

16. The light engine of claim 1, wherein the light guide have a shape of a ring, a rectangle, or a slab.

17. The light engine of claim 1, wherein the phosphors have shapes of thin films, cubes or spherical domes.

18. The light engine of claim 1, wherein the light guide is a flexible light guide.

19. The light engine of claim 1, wherein the phosphors are disposed by spray, ink-jet, or screen-printing.

20. The light engine of claim 1, wherein a reflection layer is coated on a portion of the surface of the light guide.

21. The light engine of claim 20, wherein the reflection layer is a multi-layer optical thin film filter.

22. The light engine of claim 20, wherein the reflection layer is a Distributed Bragg Reflection filter.

23. The light engine of claim 1, wherein the light source is a light source emitting a polarized light.

24. The light engine of claim 23, wherein the phosphors convert at least a portion of the light and the phosphors are operative to emit a polarized light.

25. The light engine of claim 1, wherein the light source emits a monochromatic light or a white light.

26. A light engine emitting a light, the light engine comprising:
  a light source;
  a light guide receiving the light;
  a plurality of input optical elements on the surface of the light source, each input optical element guiding the light from the light source into the light guide;
  a plurality of extraction optical elements on a surface of the light guide, the extraction optical elements extracting at least a portion of the light out of the light guide wherein the extraction optical elements and input optical elements are multiplexed volume phase grating elements and are capable of individually being electrically switched on and off; and
  a plurality compositions of phosphors, the compositions of phosphors being disposed in a pattern on the extraction optical elements producing a pattern of different spectral emitting areas by the light engine.

27. A light engine emitting a light, the light engine comprising:
  a light source;
  a light guide receiving the light;
  a plurality of extraction optical elements in a two dimensional array, each element emitting a different spectral emission on a surface of the light guide, the extraction optical elements extracting at least a portion of the light out of the light guide wherein each extraction optical element is a switchable Diffractive Optical Element (DOE) at three different locations on the light guide and each switchable DOE is addressed by a digital controller and each switchable DOE is switchable to adjust color and intensity of the light engine; and
  a plurality of phosphor compositions each emitting a different spectral emission, the phosphors compositions being disposed on top of at least some of extraction optical elements wherein each phosphor composition and each extraction optical element are select based on the desired spectral emission of red, green, and blue.

* * * * *